(12) United States Patent
Dahm et al.

(10) Patent No.: US 6,405,688 B1
(45) Date of Patent: Jun. 18, 2002

(54) COOLING CIRCUIT FOR AN INTERNAL COMBUSTION ENGINE

(75) Inventors: Christoph Dahm, Kernen; Wolfgang Dietz, Alfdorf; Hansjoerg Finkbeiner, Weilheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 25 days.

(21) Appl. No.: 09/721,739

(22) Filed: Nov. 27, 2000

(30) Foreign Application Priority Data

Nov. 26, 1999 (DE) .......................... 199 56 893

(51) Int. Cl.[7] ................ F01P 7/14; B60H 1/02
(52) U.S. Cl. ............ 123/41.1; 123/41.29; 237/12.3 B
(58) Field of Search ............... 123/41.1, 41.29; 237/12.3 R, 12.3 A, 12.3 B

(56) References Cited

FOREIGN PATENT DOCUMENTS

| DE | 195 06 935 | 4/1996 |
|---|---|---|
| DE | 195 39 605 | 4/1997 |
| EP | 0 174 800 | 3/1986 |

*Primary Examiner*—Noah P. Kamen
(74) *Attorney, Agent, or Firm*—Crowell & Moring LLP

(57) ABSTRACT

A cooling circuit for an internal combustion engine has a main heat exchanger for cooling cooling medium circulating in the cooling circuit. A secondary heat exchanger provides heating of heating air to be supplied to a vehicle interior. A thermostatic valve has a simple design which makes it possible to heat the vehicle interior even in the case of a maximum cooling capacity for the internal combustion engine. An inlet of the thermostatic valve is connected to an outlet of the internal combustion engine and a first outlet of the thermostatic valve is connected to an inlet of the main heat exchanger. An outlet of the main heat exchanger is connected to an inlet of the internal combustion engine and a second outlet of the thermostatic valve is connected to the inlet of the internal combustion engine via a short-circuit line. An inlet of the secondary heat exchanger is connected to the second outlet of the thermostatic valve and an outlet of the secondary heat exchanger is connected to the inlet of the internal combustion engine. The thermostatic valve is designed in such a way that, in a first end position (cooling mode), it fully opens the first outlet and throttles the second outlet, in an intermediate position (mixed mode) it opens the first and second outlets to a greater or lesser extent and, in a second end position (warm-up mode), it blocks the first outlet and fully opens the second outlet.

14 Claims, 2 Drawing Sheets

COOLING CIRCUIT FOR AN INTERNAL COMBUSTION ENGINE

BACKGROUND AND SUMMARY OF THE DISCLOSURE

This application claims the priority of German Patent Application No. 199 56 893.6, filed in Germany, Nov. 26, 1999, the disclosure of which is expressly incorporated by reference herein.

The invention relates to a cooling circuit for an internal combustion engine, with a main heat exchanger for cooling the cooling medium circulating in the cooling circuit, with a secondary heat exchanger for the heating of heating air to be supplied to a vehicle interior and with a thermostatic valve.

German Patent Document DE 195 39 605 A1 discloses a heating heat exchanger system which is connected to the cooling system of an internal combustion engine and serves for vehicle heating. Hot cooling medium coming from an internal combustion engine is supplied via a supply line to a thermostatic valve which returns this cooling medium to the engine either indirectly via a vehicle radiator during normal operation or directly via a short-circuit line in a warm-up phase of the engine. Arranged in the supply line to the thermostatic valve is a heat exchanger serving for heating a closed heating circuit in which a vehicle interior heating system is arranged. In this heating circuit, a separate pump is arranged, which drives a heat transfer medium in the heating circuit as a function of the heating capacity required.

German Patent Document DE 195 06 935 C1 discloses a cooling circuit for an internal combustion engine of a motor vehicle, said cooling circuit having an open heating circuit for heating a heating body for heating the interior of a vehicle. In this case, some of the heated cooling fluid is extracted directly at the internal combustion engine for the heating circuit and returned to the cooling circuit again.

Cooling circuits of this type with an open or a closed heating circuit have a complicated design which, particularly because of the pump additionally required, is relatively costly.

European Patent Document EP 0 174 800 A1 discloses a cooling circuit which manages without a second pump. A thermostatic valve is shown there, which has a first and a second inlet and a first and a second outlet. The first inlet and the second outlet are tied into a cooling circuit of an internal combustion engine, whilst the second inlet and the first outlet are connected to an inlet and an outlet of a heat exchanger which serves for the heating of air to be supplied to a vehicle interior. The thermostatic valve connects the first inlet to the first outlet and the second inlet to the second outlet, so that the cooling medium is extracted from the cooling circuit and is returned to the cooling circuit again via the heat exchanger. As a function of the pressure gradient prevailing in the cooling circuit between the first inlet and second outlet, the actuator in the thermostatic valve opens to a greater or lesser extent a bypass which allows a direct throughflow from the first inlet to the second outlet, the heat exchanger being bypassed.

In an arrangement of this type, however, the volumetric flow of the cooling medium flowing through the internal combustion engine depends on the switching position of the thermostatic valve. However, changes in throughflow quantities, which may occur simultaneously with a change in temperature of the cooling medium flowing through the engine, are undesirable, since this may lead to high thermal expansion loads on the internal combustion engine and entail the risk of cracking.

Furthermore, the pressure gradient between the first inlet and the second outlet depends, in this case, on the pumping capacity of a pump driving the cooling medium and therefore normally on the rotational speed of the internal combustion engine correlated to this pumping capacity, so that, with an increase in rotational speed, the bypass is opened more and more and the flow through the heat exchanger is blocked more and more. Beyond a specific engine rotational speed, the flow through the heat exchanger is then blocked completely, so that, beyond this rotational speed, the heating of the vehicle interior no longer functions.

The present invention is concerned with the problem of producing a cooling circuit of the type mentioned in the introduction, in such a way as to provide a relatively cost-effective design which ensures heating via the secondary heat exchanger in all the operating states of the internal combustion engine.

This problem is solved, according to the invention, by means of a cooling circuit for an internal combustion engine, comprising:

a main heat exchanger for cooling the cooling medium circulating in the cooling circuit, a secondary heat exchanger for the heating of heating air to be supplied to a vehicle interior, and a thermostatic valve, an inlet of the thermostatic valve being connected to an outlet of the internal combustion engine, a first outlet of the thermostatic valve being connected to an inlet of the main heat exchanger, an outlet of the main heat exchanger being connected to an inlet of the internal combustion engine, a second outlet of the thermostatic valve being connected to the inlet of the internal combustion engine via a short-circuit line, an inlet of the secondary heat exchanger being connected to the second outlet of the thermostatic valve, and an outlet of the secondary heat exchanger being connected to the inlet of the internal combustion engine, wherein the thermostatic valve is configured in such a way that the thermostatic valve:

fully opens the first outlet and throttles the second outlet in a first end position corresponding to an engine cooling mode, opens the first outlet and the second outlet to a greater or lesser extent in intermediate positions corresponding to a mixed mode, and blocks the first outlet and fully opens the second outlet in a second end position corresponding to a warm-up mode.

The invention is based on the general notion of using a throttled bypass to avoid complete blocking of a valve outlet assigned to the inlet of the secondary heat exchanger. In this way, in any operating phase of the engine, cooling medium can be conducted through the secondary heat exchanger, in order to make heating possible. The thermostatic valve outlet throttled for this purpose thus allows a minimum flow of cooling medium to pass through in order to operate the heating system.

According to an advantageous feature of preferred embodiments, the secondary heat exchanger may be arranged in a short-circuit line which, for a warm-up phase, supplies the cooling medium flowing off from the internal combustion engine directly to the internal combustion engine again, the main heat exchanger being bypassed. The thermostatic valve outlet assigned to the short-circuit line is thereby connected to the inlet of the internal combustion engine via the secondary heat exchanger. Such a form of construction is particularly cost-effective, since there is no need for additional lines.

According to a further advantageous feature of preferred embodiments, the individual components of the cooling circuit may be dimensioned and coordinated with one another in such a way that a throughflow resistance between a second outlet of the thermostatic valve and the inlet of the internal combustion engine is approximately equal to a throughflow resistance between a first outlet of the thermostatic valve and the inlet of the internal combustion engine. The volumetric flow flowing through the internal combustion engine is thus independent of the position of the thermostatic valve. The risk of damage to the internal combustion engine by a simultaneous jump in the volumetric flow and in the temperature of the cooling medium can be reduced as a result.

Further important features and advantages of the invention may be gathered from the claims, the drawings and the accompanying FIG. descriptions with reference to the drawings.

It goes without saying that the features mentioned above and those still to be explained below can be used not only in the combination specified in each case, but also in other combinations or alone, without departing from the scope of the present invention.

Preferred exemplary embodiments of the invention are illustrated in the drawings and are explained in more detail in the following description.

Other objects, advantages and novel features of the present invention will become apparent from the following detailed description of the invention when considered in conjunction with the accompanying drawings.

DETAILED DESCRIPTION OF THE DRAWINGS

Figure 1:
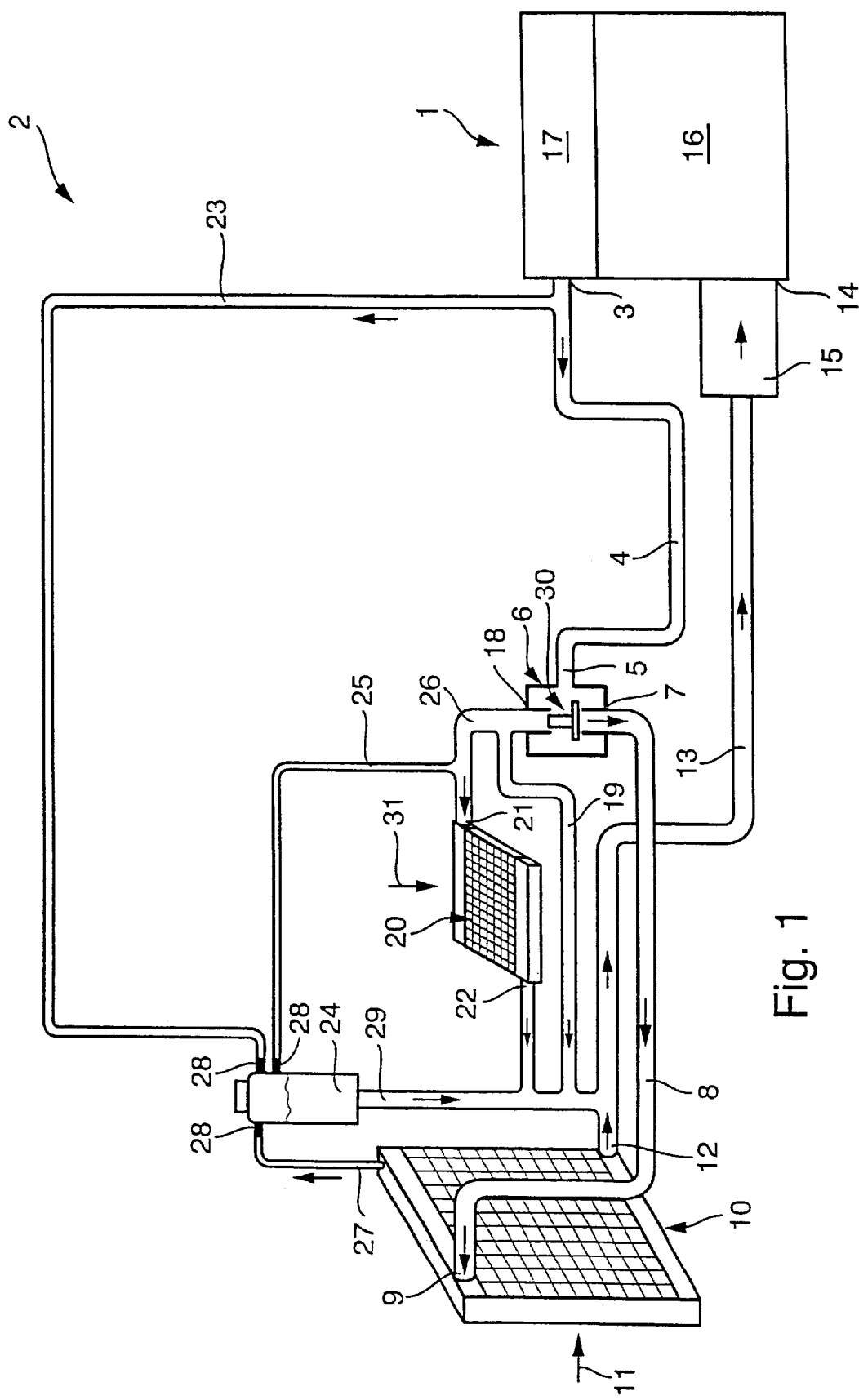
FIG. 1 is a schematic basic illustration of a cooling circuit constructed according to preferred embodiments of the invention.

According to FIG. 1, an internal combustion engine 1 is equipped with a cooling circuit 2 according to the invention, in order to cool the internal combustion engine 1. An outlet 3 of the internal combustion engine 1 is connected to an inlet 5 of a thermostatic valve 6 via an engine discharge line 4. A first outlet 7 of this thermostatic valve 6 is connected to an inlet 9 of a main heat exchanger 10 via a radiator supply line 8.

This main heat exchanger serves for cooling a cooling medium circulating in the cooling circuit 2 and, for this purpose, is exposed to the action of cooling air which is symbolized here by an arrow 11. In a vehicle, this main heat exchanger 10 is conventionally designated as a "radiator".

An outlet 12 of the main heat exchanger 10 is connected to an inlet 14 of the internal combustion engine 1 via an engine supply line 13. At the same time, a cooling-medium pump 15 is arranged directly on the internal combustion engine 1, said pump receiving the cooling medium from the engine supply line 13 on the suction side and conveying this cooling medium into the inlet 14 of the internal combustion engine 1 on the delivery side.

While the cooling-medium inlet 14 of the internal combustion engine 1 is located in the usual way in the region of a crankcase 16, the cooling-medium outlet 3 of the internal combustion engine 1 is formed in the usual way on a cylinder head 17. As a rule, the cooling-medium pump 15 is directly driven mechanically by the engine 1, so that the rotational speed and therefore the delivery capacity of the cooling-medium pump 15 are proportional to the rotational speed of the internal combustion engine 1.

The thermostatic valve 6 also has a second outlet 18 which communicates with the engine supply line 13 and therefore with the inlet 14 of the engine 1 via a short-circuit line 19. Arranged parallel to the short-circuit line 19 is a secondary heat exchanger 20, the inlet 21 of which is likewise connected to the second outlet 18 of the thermostatic valve 6, while an outlet 22 of the secondary heat exchanger 20 communicates with the engine supply line 13 and therefore with the inlet 14 of the internal combustion engine 1.

The secondary heat exchanger 20 and the short-circuit line 19 are dimensioned such that the throughflow resistance of the secondary heat exchanger 20 and short-circuit line 19 is approximately equal to the throughflow resistance of the main heat exchanger 10.

According to another embodiment, the secondary heat exchanger 20 may be integrated into the short-circuit line 19, in which case the flow resistance of the secondary heat exchanger 20 and short-circuit line 19 may likewise be made approximately equal to the flow resistance through the main heat exchanger 10.

The engine discharge line 4 is connected via a first venting line 23 to a compensating reservoir 24 which compensates thermal expansion effects of the cooling medium and minor leakages. A second venting line 25 connects the compensating reservoir to the short-circuit line 19 or to a line segment 26 which connects the second outlet 18 of the thermostatic valve 6 to the inlet 22 of the secondary heat exchanger 20. A third venting line 27 connects the main heat exchanger 10 to the compensating reservoir 24. The venting lines 23, 25, 27 in each case open into the compensating reservoir 24 via throttles 28. Connected to the bottom of the compensating reservoir 24 is a fill-up line 29 which communicates with the engine supply line 13 and ensures that the cooling circuit 2 always contains sufficient cooling medium.

The secondary heat exchanger 20 serves for heating up an airstream, symbolized by an arrow 31, which is to be supplied to a vehicle interior, so that the secondary heat exchanger 20 may also be designated as a "heating body".

Figure 2A:
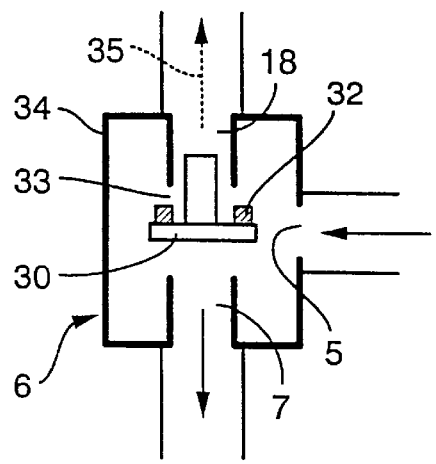
FIGS. 2a–2c show a view of a thermostatic valve from the cooling circuit according to FIG. 1 according to a detail identified in FIG. 1 by II, a blocking member of the thermostatic valve assuming a first end position in FIG. 2a, an intermediate position in FIG. 2b and a second end position in FIG. 2c.
Figure 2B:
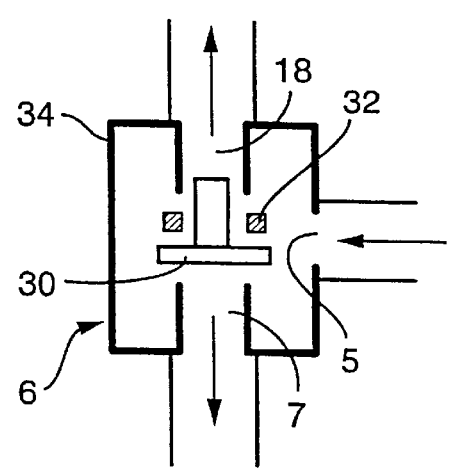
Figure 2C:
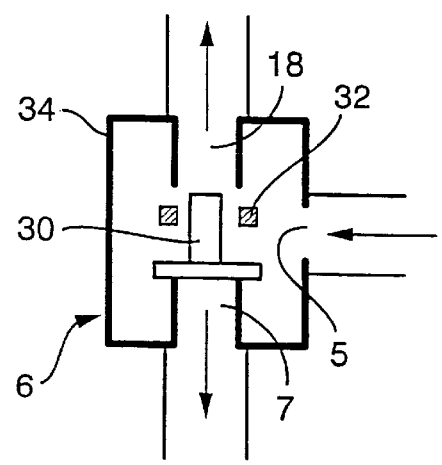

The thermostatic valve 6 contains a blocking member 30 which cooperates with the outlets 7 and 18 of the thermostatic valve 6 and which blocks or opens to a greater or lesser extent one outlet 7 or the other outlet 18 as a function of the temperature of the cooling medium. FIGS. 2a to 2c reproduce individual switching positions of the blocking member 30. In this context, FIG. 2a shows a first end position of the blocking member 30, in which the first outlet 7 is opened completely and the second outlet 18 is throttled. The main stream of cooling medium is therefore supplied to the main heat exchanger 10 via the first outlet 7, so that a maximum cooling capacity for cooling the internal combustion engine 1 is achieved. This end position of the blocking member 30 thus serves for a cooling mode of the cooling circuit 2.

In order to implement the throttling of the second outlet 18, according to FIG. 2a a bypass 33 is formed, for example by stop means 32, through which bypass the cooling medium flowing through the inlet 5 into a housing 34 of the thermostatic valve 6 can flow off through the second outlet 18, at the same time bypassing the blocking member 30. This throttled flow-off is symbolized in FIG. 2a by an arrow 35 illustrated by a dotted line. Even in the cooling mode with maximum cooling of the cooling medium by the main radiator 10, a heating mode can be achieved via the heating body 20 by means of this bypass 33. In the cooling circuit 2 according to the invention, complete blocking of the second outlet 18 is not possible due to the correspondingly designed thermostatic valve 6.

In an intermediate position illustrated in FIG. 2b, a mixing mode of the cooling circuit 2 is implemented, in which both outlets 7 and 18 are opened to a greater or lesser extent. In this case, the division of the cooling medium supplied via the inlet 5 between the two outlets 7 and 18 depends on the relative position of the blocking member 30 within the thermostatic valve 6, this relative position, in turn, usually depending on the temperature prevailing in the cooling medium. In this case, this blocking member 30 may be a conventionally designed element operating thermomechanically. A version with an electrically driven element is also possible.

FIG. 2c shows a second end position of the blocking member 30, in which the blocking member 30 completely closes the first outlet 7, so that the entire stream of cooling medium is discharged through the second outlet 18. This second end position therefore corresponds to a warm-up mode of the cooling circuit 2 or of the internal combustion engine 1.

During the warm-up mode, the main heat exchanger 10 is bypassed, so that, on the one hand, a reduced quantity of cooling medium is circulated and, on the other hand, rapid heating of the circulated cooling medium and of the internal combustion engine 1 is achieved due to the absence of a cooling effect of the main radiator 10. When a specific temperature threshold value is reached, the thermostatic valve 6 gradually opens, so that correspondingly more cooling medium is circulated and a corresponding cooling effect due to the flow through the main heat exchanger 10 is achieved. The cooling circuit 2 then operates in the mixed mode. When the maximum cooling capacity is required, the cooling circuit operates in the cooling mode, in which the flow-off through the second outlet 18 is throttled to a minimum value, this throttled throughflow through the secondary heat exchanger 20 being sufficient, where appropriate, to operate a vehicle heating system.

By virtue of the flow resistances selected for the individual line segments and components of the cooling circuit 2, the flow resistance and therefore the throughflow quantity through the internal combustion engine 1 remain independent of the respective position of the blocking member 30 in the thermostatic valve 6, since both the outlet 22 of the secondary heat exchanger 20 and the short-circuit line 19 and also the outlet 12 of the main heat exchanger 10 open into the engine supply line 13. By virtue of this design, there is a minimal load on structural parts, as a result of which, in particular, the service life of the internal combustion engine 1 is prolonged.

Figure 3:
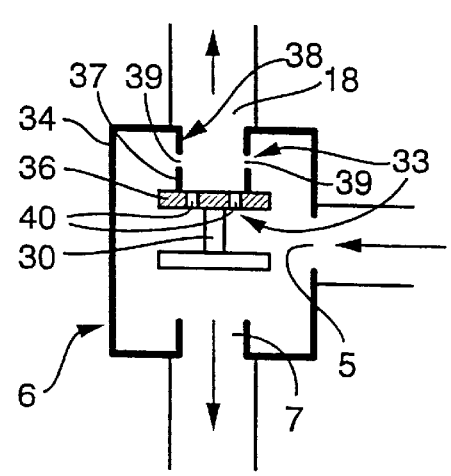
FIG. 3 shows a view of the same detail as in FIG. 2a, but of another embodiment of the thermostatic valve.

According to FIG. 3, the bypass 33 may be produced in that the blocking member 30 has a sealing disc 36 which cooperates with the second outlet 18 and, in the first end position illustrated in FIG. 3, comes to bear on a valve seat 37. In this case, this valve seat 37 is formed by a nipple 38 which projects into the housing 34 of the thermostatic valve 6 and contains radial orifices 39 which form the bypass 33. Alternatively or additionally to this, the bypass 33 may also be formed by axial orifices 40 in the sealing disc 36 of the blocking member 30.

Figure 4:
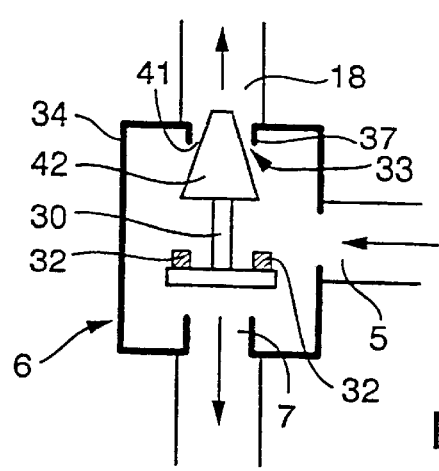
FIG. 4 shows a view of the same detail as in FIG. 2a, but of a further embodiment of the thermostatic valve.

According to FIG. 4, the bypass 33 may also be formed by a throttle gap 41 which is formed, in the first end position of the blocking member 30, between the blocking member 30 and the valve seat 37 cooperating with the latter. According to a preferred embodiment, for this purpose, the blocking member 30 may have a conical or frustoconical sealing body 42. The formation of the throttle gap 41, which has an annular shape in FIG. 4, may again be implemented, for example, by stop means 32, with which the blocking member 30 cooperates when it reaches its end position assigned to the cooling mode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Cooling circuit for an internal combustion engine, comprising:
    a main heat exchanger for cooling the cooling medium circulating in the cooling circuit,
    a secondary heat exchanger for the heating of heating air to be supplied to a vehicle interior, and
    a thermostatic valve,
    an inlet of the thermostatic valve being connected to an outlet of the internal combustion engine,
    a first outlet of the thermostatic valve being connected to an inlet of the main heat exchanger,
    an outlet of the main heat exchanger being connected to an inlet of the internal combustion engine,
    a second outlet of the thermostatic valve being connected to the inlet of the internal combustion engine via a short-circuit line,
    an inlet of the secondary heat exchanger being connected to the second outlet of the thermostatic valve, and
    an outlet of the secondary heat exchanger being connected to the inlet of the internal combustion engine,
    wherein the thermostatic valve is configured in such a way that the thermostatic valve:
        fully opens the first outlet and throttles the second outlet in a first end position corresponding to an engine cooling mode,
        opens the first outlet and the second outlet to a greater or lesser extent in intermediate positions corresponding to a mixed mode, and
        blocks the first outlet and fully opens the second outlet in a second end position corresponding to a warm-up mode.

2. Cooling circuit according to claim 1, wherein the secondary heat exchanger is arranged in the short-circuit line so that the second outlet of the thermostatic valve is connected to the inlet of the internal combustion engine via the secondary heat exchanger.

3. Cooling circuit according to claim 2, wherein the components of the cooling circuit are dimensioned and coordinated with one another in such a way that a throughflow resistance between the second outlet of the thermostatic valve and the inlet of the internal combustion engine is approximately equal to a throughflow resistance between the first outlet of the thermostatic valve and the inlet of the internal combustion engine.

4. Cooling circuit according to claim 3, wherein the thermostatic valve contains a blocking member which closes the second outlet in the first end position of the thermostatic valve, a bypass being formed which bypasses the blocking member in a throttled manner.

5. Cooling circuit according to claim 2, wherein the thermostatic valve contains a blocking member which closes the second outlet in the first end position of the thermostatic valve, a bypass being formed which bypasses the blocking member in a throttled manner.

6. Cooling circuit according to claim 5, wherein the bypass is formed by a throttle gap between the blocking member, and a thermostatic valve seat when the thermostatic valve is in the first end position.

7. Cooling circuit according to claim 5, wherein the bypass is formed by at least one throttle bore in at least one of the blocking member and a valve seat of the thermostatic valve.

8. Cooling circuit according to claim 1, wherein the components of the cooling circuit are dimensioned and coordinated with one another in such a way that a throughflow resistance between the second outlet of the thermostatic valve and the inlet of the internal combustion engine is approximately equal to a throughflow resistance between the first outlet of the thermostatic valve and the inlet of the internal combustion engine.

9. Cooling circuit according to claim 8, wherein the thermostatic valve contains a blocking member which closes the second outlet in the first end position of the thermostatic valve, a bypass being formed which bypasses the blocking member in a throttled manner.

10. Cooling circuit according to claim 9, wherein the bypass is formed by a throttle gap between the blocking member, and a thermostatic valve seat when the thermostatic valve is in the first end position.

11. Cooling circuit according to claim 9, wherein the bypass is formed by at least one throttle bore in at least one of the blocking member and a valve seat of the thermostatic valve.

12. Cooling circuit according to claim 1, wherein the thermostatic valve contains a blocking member which closes the second outlet in the first end position of the thermostatic valve, a bypass being formed which bypasses the blocking member in a throttled manner.

13. Cooling circuit according to claim 12, wherein the bypass is formed by a throttle gap between the blocking member, and a thermostatic valve seat when the thermostatic valve is in the first end position.

14. Cooling circuit according to claim 12, wherein the bypass is formed by at least one throttle bore in at least one of the blocking member and a valve seat of the thermostatic valve.

* * * * *